(12) United States Patent
Nguyen et al.

(10) Patent No.: US 12,451,824 B1
(45) Date of Patent: Oct. 21, 2025

(54) HYBRID ELECTRIC PROPULSION SYSTEM WITH REGENERATION AND METHOD FOR OPERATING THE SAME

(71) Applicant: Pratt & Whitney Canada Corp., Longueuil (CA)

(72) Inventors: Kevin Nguyen, Montreal (CA); Xuening Lu, Oakville (CA); Louis-Philippe Larose, St-Sabine (CA); Carmine Lisio, Laval (CA); Eric Ostiguy, St-Basile-le-Grand (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/771,371

(22) Filed: Jul. 12, 2024

(51) Int. Cl.
| | |
|---|---|
| *H02P 9/06* | (2006.01) |
| *B64D 27/33* | (2024.01) |
| *B64D 31/18* | (2024.01) |
| *B64D 35/022* | (2025.01) |
| *H02K 7/108* | (2006.01) |
| *H02K 7/116* | (2006.01) |
| *H02K 7/18* | (2006.01) |
| *H02P 101/25* | (2016.01) |
| *H02P 101/30* | (2015.01) |

(52) U.S. Cl.
CPC ............. *H02P 9/06* (2013.01); *B64D 27/33* (2024.01); *B64D 31/18* (2024.01); *B64D 35/022* (2024.01); *H02K 7/108* (2013.01); *H02K 7/116* (2013.01); *H02K 7/1823* (2013.01); *H02P 2101/25* (2015.01); *H02P 2101/30* (2015.01)

(58) Field of Classification Search
CPC .... H02P 9/06; H02P 2101/25; H02P 2101/30; B64D 27/33; B64D 31/18; B64D 35/022; H02K 7/108; H02K 7/116; H02K 7/1823
See application file for complete search history.

(56) References Cited

U.S. PATENT DOCUMENTS

| | | | |
|---|---|---|---|
| 10,850,863 B2 | 12/2020 | Bisson | |
| 11,186,378 B2 | 11/2021 | Dubreuil | |
| 11,691,742 B1 * | 7/2023 | Mark | B64D 27/33 60/698 |
| 11,912,421 B2 | 2/2024 | Botti | |
| 2020/0277062 A1 * | 9/2020 | Becker | B64D 27/24 |
| 2021/0039801 A1 | 2/2021 | Spierling | |
| 2021/0179286 A1 * | 6/2021 | Harvey | B64D 35/08 |
| 2022/0289398 A1 | 9/2022 | Devendorf | |

* cited by examiner

*Primary Examiner* — Joseph Ortega
(74) *Attorney, Agent, or Firm* — Getz Balich LLC

(57) ABSTRACT

A method of regenerating an electric power storage unit for an aircraft hybrid electric propulsion (HEP) system is provided. The HEP system includes a thermal engine, an electric motor, an electric power storage unit, a primary gearbox, and a propulsion unit. The electric motor is configured to selectively provide rotational drive to the propulsion unit. The method includes: controlling the electric motor to operate as the generator; controlling the primary gearbox to be in an output disengaged configuration, wherein in the output disengaged configuration the primary gearbox is disengaged from driving the propulsion unit and the primary gearbox is transfers rotational drive produced by the thermal engine to the electric motor; operating the thermal engine to drive the primary gearbox in the output disengaged configuration; and regenerating the electric power storage unit by providing electrical energy produced by the electric motor to the electric power storage unit.

19 Claims, 3 Drawing Sheets

HYBRID ELECTRIC PROPULSION SYSTEM WITH REGENERATION AND METHOD FOR OPERATING THE SAME

BACKGROUND OF THE INVENTION

1. Technical Field

The present disclosure relates to aircraft hybrid electric propulsion systems in general and to aircraft hybrid electric propulsion systems configured for regeneration in particular.

2. Background Information

It is known that an electric power storage unit of a conventional hybrid electric propulsion (HEP) system for an aircraft may be regenerated (i.e., recharged) on the ground by a ground source of electrical power; e.g., a ground power unit that is independent of the HEP system and/or the aircraft 22, or grid power. Depending on the flight of the aircraft, it may or may not be possible to fully charge the electric power storage unit during flight. Recharging when the aircraft is stationary on ground requires a ground power source. It is very often the case that a ground power source is not available. This is particularly true for fixed wing aircraft that access non-commercial airports and rotary craft that access landing areas that are not airports. It would be advantageous to provide a method and system for recharging the electric power storage unit of a HEP system that does not require ground power.

SUMMARY

According to an aspect of the present disclosure, a method of regenerating an electric power storage unit for an aircraft hybrid electric propulsion (HEP) system is provided. The HEP system includes a thermal engine, an electric motor, an electric power storage unit, a primary gearbox, and a propulsion unit. The electric motor is configured within the HEP system to selectively provide rotational drive to the propulsion unit. The method includes: controlling the electric motor to operate as the generator and produce electrical energy; controlling the primary gearbox of the HEP system to be in an output disengaged configuration, wherein in the output disengaged configuration the primary gearbox is configured to be disengaged from driving the propulsion unit and the primary gearbox is configured to transfer rotational drive produced by the thermal engine to the electric motor; operating the thermal engine to rotationally drive the primary gearbox in the output disengaged configuration and thereby drive the electric motor; and regenerating the electric power storage unit by providing electrical energy produced by the electric motor to the electric power storage unit.

In any of the aspects or embodiments described above and herein, the primary gearbox may include first and second input shafts and an output shaft, and the first input shaft may be in drive communication with the electric motor, and the second input shaft may be in drive communication with the thermal engine, and the output shaft may be in drive communication with the propulsion unit.

In any of the aspects or embodiments described above and herein, the primary gearbox may be controllable to be in the output disengaged configuration and in an output engaged configuration. In the output disengaged configuration, the first and second input shafts may be disengaged from the output shaft, and in the output engaged configuration, the first and second input shafts may be engaged with the output shaft.

In any of the aspects or embodiments described above and herein, the primary gearbox may include a clutch mechanism, and the clutch mechanism may be controllable to disengage the output shaft from the first and second input shafts, and the clutch mechanism may be controllable to engage the first and second input shafts with the output shaft.

In any of the aspects or embodiments described above and herein, the primary gearbox may include first and second input shafts, an output shaft, and a clutch mechanism. The method may include controlling the clutch mechanism to dispose the primary gearbox in an output engaged configuration to drive the propulsion unit, and controlling the clutch mechanism to dispose the primary gearbox in an output disengaged configuration during regeneration of the electric power storage unit.

In any of the aspects or embodiments described above and herein, the method may include determining a state of charge of the electric power storage unit state prior to performing the step of operating the thermal engine and the step of regenerating the electric power storage unit.

In any of the aspects or embodiments described above and herein, the method may include determining whether the aircraft is stationary and on a ground surface prior to performing the step of operating the thermal engine and the step of regenerating the electric power storage unit.

In any of the aspects or embodiments described above and herein, the method may include monitoring the state of charge of the electric power storage unit during the step of regenerating the electric power storage unit.

According to an aspect of the present disclosure, a method of regenerating an electric power storage unit for an aircraft hybrid electric propulsion (HEP) system is provided. The HEP system includes a thermal engine, an electric motor, an electric power storage unit, a primary gearbox, and a propulsion unit. The electric motor is configured within the HEP system to selectively provide rotational drive to the propulsion unit, and the thermal engine is configured within the HEP system to selectively provide rotational drive to the propulsion unit. The method includes: operating a first clutch mechanism to disengage the electric motor from the primary gearbox and to engage with an intermediary shaft; operating a second clutch mechanism to disengage the thermal engine from the primary gearbox and to engage with the intermediary shaft; controlling the electric motor to operate as the generator and produce electrical energy; operating the thermal engine to rotationally drive the electric motor using the intermediary shaft; and regenerating the electric power storage unit by providing electrical energy produced by the electric motor to the electric power storage unit.

In any of the aspects or embodiments described above and herein, the method may include driving an accessory using the intermediary shaft.

According to another aspect of the present disclosure, an aircraft hybrid electric propulsion (HEP) system for an aircraft is provided that includes a propulsion unit, a primary gearbox, a thermal engine, an electric motor, an electric power storage unit, and a system controller. The primary gearbox is in selective drive communication with the propulsion unit. The thermal engine is in drive communication with the primary gearbox and is configured to provide rotational drive to the propulsion unit. The electric motor is in drive communication with the primary gearbox and is configured to provide rotational drive to the propulsion unit.

The system controller is in communication with the primary gearbox and the electric motor, and a non-transitory memory storing instructions. The instructions when executed cause the system controller to: control the electric motor to operate as the generator and produce electrical energy; control the primary gearbox to be in an output disengaged configuration, wherein in the output disengaged configuration the primary gearbox is configured to be disengaged from driving the propulsion unit and the primary gearbox is configured to transfer rotational drive produced by the thermal engine to the electric motor; operate the thermal engine to rotationally drive the primary gearbox in the output disengaged configuration and thereby drive the electric motor; and regenerate the electric power storage unit by providing electrical energy produced by the electric motor to the electric power storage unit.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
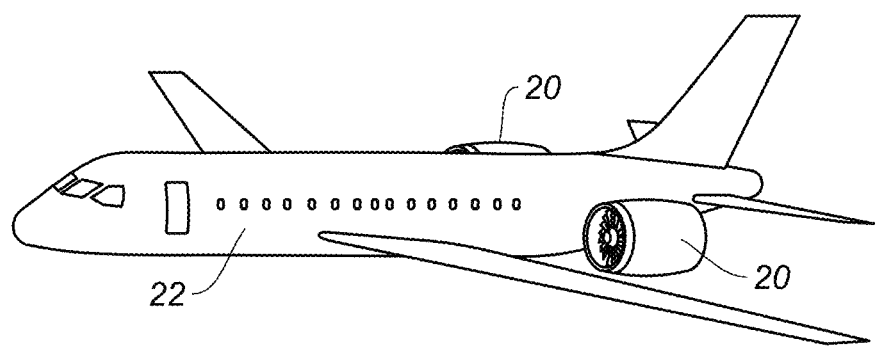
FIG. 1 is a diagrammatic view of an aircraft.

The present disclosure system is directed to an aircraft that includes one or more hybrid electric propulsion (HEP) systems. FIG. 1 illustrates a manned fixed wing aircraft 22 having a pair of HEP systems 20. The present disclosure is not limited to this aircraft 22 example, and is applicable to other aircraft 22 including unmanned fixed wing aircraft, manned rotary aircraft, unmanned rotary aircraft, and the like.

Figure 3:
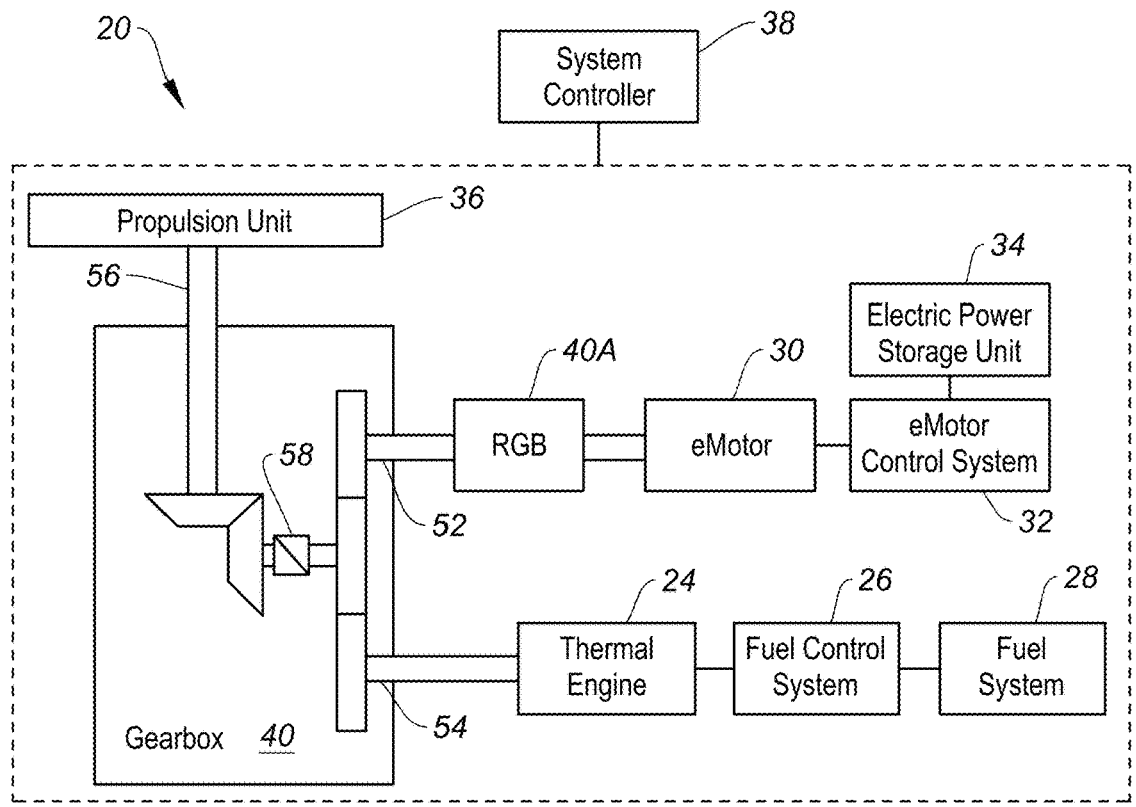
FIG. 3 is a diagrammatic view of a present disclosure hybrid electric propulsion system embodiment.
Figure 4:
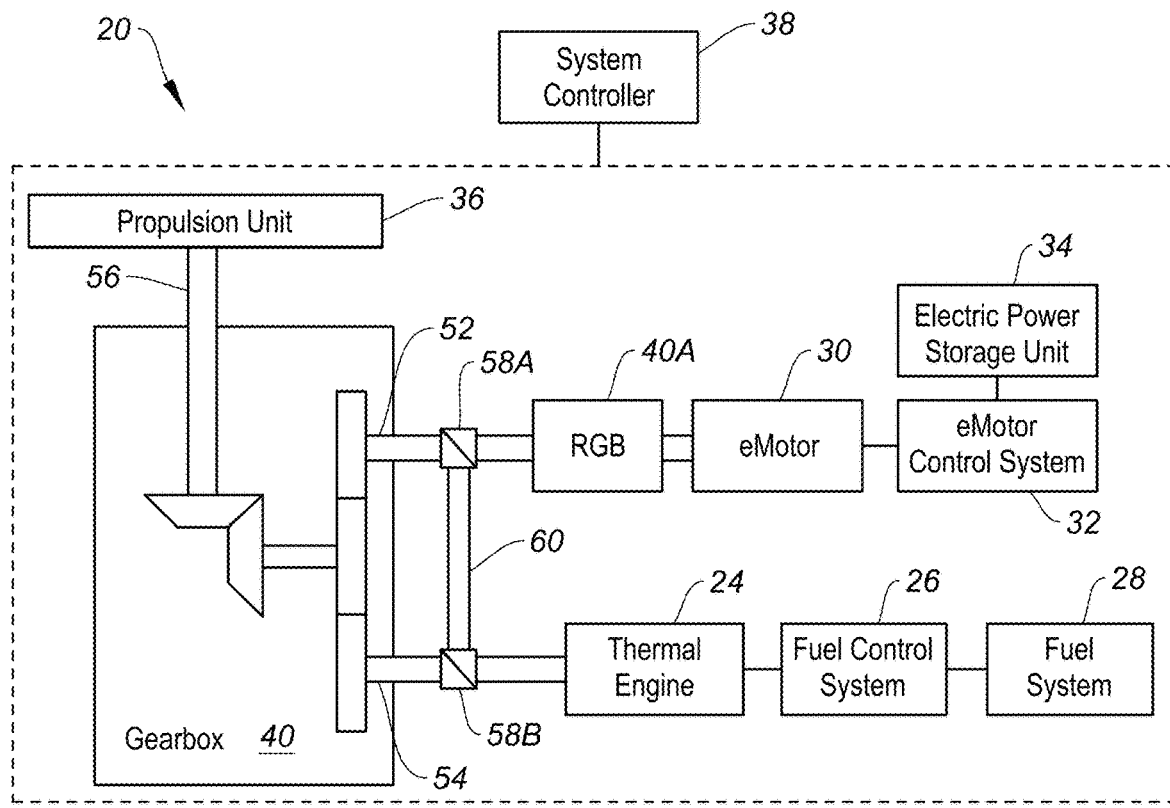
FIG. 4 is a diagrammatic view of a present disclosure hybrid electric propulsion system embodiment.
Figure 5:
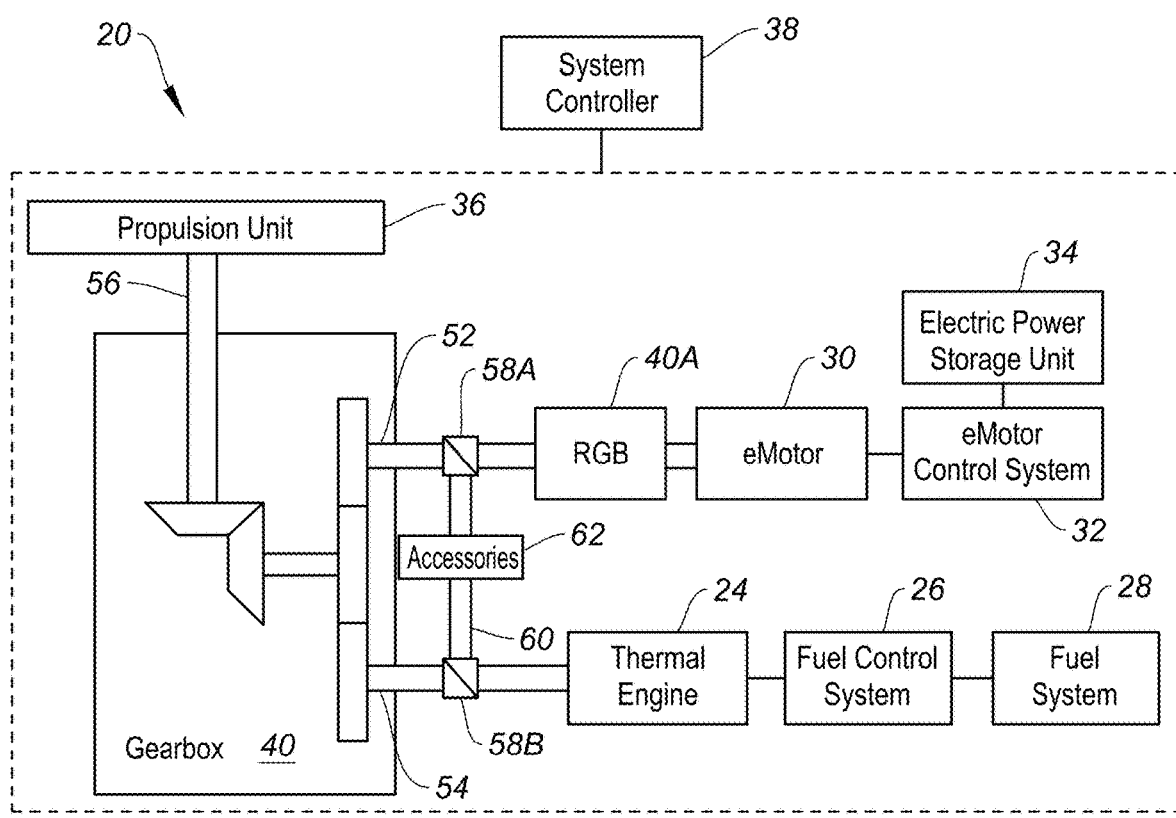
FIG. 5 is a diagrammatic view of a present disclosure hybrid electric propulsion system embodiment.

FIGS. 3-5 illustrates embodiments of a present disclosure HEP system 20 that include a thermal engine 24, a fuel control system 26, a fuel system 28, an electric motor 30 ("eMotor"), an eMotor control system 32, an electric power storage unit 34, a propulsion unit 36, a system controller 38, and a gearbox 40. To facilitate the description herein, the present disclosure HEP system 20 is described as a singular system that can be used to power an aircraft 22. In some embodiments, more than one present disclosure HEP system 20 may be used to power an aircraft 22; e.g., a twin engine aircraft 22 like that shown in FIG. 1. Hence, the present disclosure is not limited to a particular number of present disclosure HEP systems 20 powering an aircraft 22.

Figure 2:
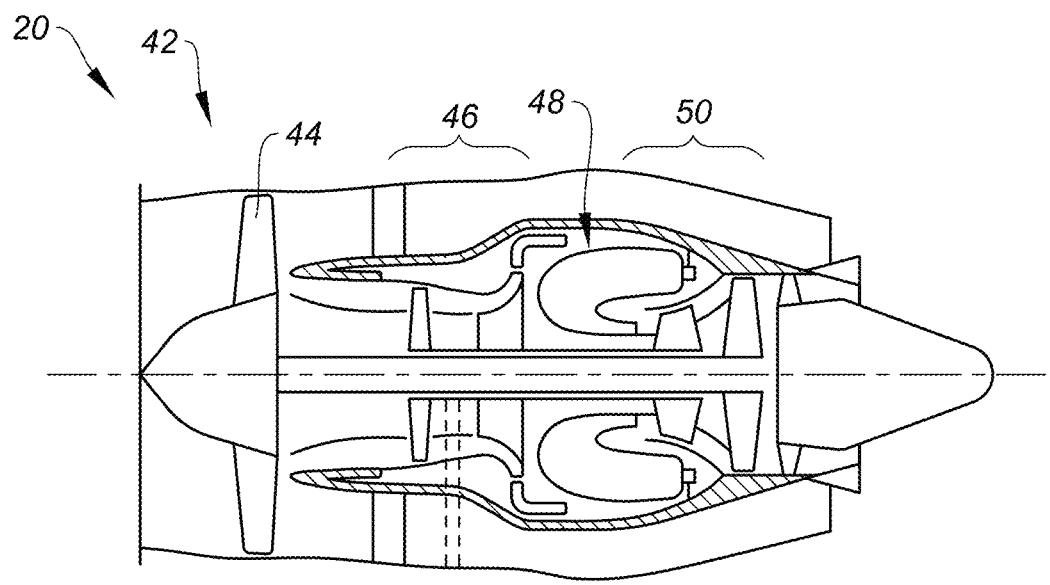
FIG. 2 is a diagrammatic sectional view of a gas turbine engine.

The term "thermal engine" as used herein includes various types of gas turbine engines, internal combustion engines, and the like that combust traditional aviation fuels and/or sustainable aviation fuels (SAFs), or the like. FIG. 2 illustrates a thermal engine 24 in the form of a gas turbine engine 42 of a type preferably provided for use in subsonic flight, generally comprising in serial flow communication a fan 44 through which ambient air is propelled, a compressor section 46 for pressurizing the air, a combustion section 48 in which the compressed air is mixed with fuel and ignited for generating an annular stream of hot combustion gases, and a turbine section 50 for extracting energy from the combustion gases. The gas turbine engine 42 example shown in FIG. 2 is a two-spool turbofan rotational about a rotational axis. The present disclosure is not limited to use with any particular type of thermal engine.

Referring to FIGS. 3-5, the eMotor 30 may be an alternating current (AC) motor that can be operated to provide rotational drive to a component (e.g., a gearbox 40 in communication with a propulsion unit 36) or can be operated to function as a generator, as will be detailed herein.

The propulsion unit 36 is a driven device that is configured to selectively power an aircraft 22; e.g., via a propeller, a rotor, a fan, or the like. The propulsion unit 36 as described herein includes a propeller that has propeller blades. The present disclosure is not limited to use with a propulsion unit 36 that includes propeller blades.

The electric power storage unit 34 is configured to selectively store electrical energy in a first operational mode (i.e., a charging mode), and to produce electrical energy in a second operational mode (i.e., a discharging mode). An example of an electric power storage unit 34 is one that includes one or more batteries. Electric power storage devices 34 other than batteries may be used in some embodiments.

The eMotor control system 32 may include hardware and controls for providing electrical power to the eMotor 30 and for receiving electrical power from the eMotor 30. The eMotor control system 32 may include an inverter. In instances when the eMotor 30 is controlled to operate in a generator mode, the eMotor control system 32 may be configured to manage the eMotor 30 produced electrical power to the electric power storage unit 34 for recharging purposes.

The fuel system 28 may include a fuel reservoir and one or more fuel pumps for pumping the fuel to the thermal engine 24.

The fuel control system 26 may include an electronic controller such as a FADEC or may include a mechanical controller, or any combination thereof. The present disclosure is not limited to any particular type of fuel control system 26.

The term "system controller 38" as used herein refers to a device that may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the HEP system 20 (or a system component) to accomplish the same algorithmically and/or coordination of system components. The system controller 38 may include or may be in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The system controller 38 may include, or may be in communication with, an input device (not shown) that enables a user to enter data and/or instructions, and may include, or be in communication with, an output device (not shown) configured, for example to display information, or to transfer data, etc. Communications between the system controller 38 and other system components may be via a hardwire connection or via a wireless connection.

Present disclosure HEP system 20 embodiments may have integrated system components. A system controller 38 may be utilized to control those system components and to perform the functionality described herein. For example, the engine electric control unit ("EECU") may operate as the system controller 38. In some embodiments the eMotor control system 32 may be integral with a system controller 38. In other system embodiments, one or more system components may include a dedicated controller for the respective component and that component controller is in communication with a system controller 38. For example, in some embodiments the eMotor control system 32 may include a controller and may be independent of and in communication with a system controller 38. In other system embodiments, component controllers may be in communication with one another and collectively configured as a system controller 38. FIG. 2 diagrammatically illustrates the HEP system 20 having an independent controller to facilitate the description herein. The present disclosure HEP system 20 is not limited to having an independent controller, and in fact is not limited to any particular controller architecture unless specifically stated herein.

Embodiments of the gearbox 40 include a first input shaft 52, a second input shaft 54, and an output shaft 56. The first and second input shafts 52, 54 and the output shaft 56 may each be configured in a variety of different ways. For example, any one of the first and second input shafts 52, 54 and the output shaft 56 may be disposed internally within the gearbox 40 and may be configured to receive a male shaft from a device; e.g., a shaft from the eMotor 30 or from the thermal engine 24, or the like. The present disclosure is not limited to any particular gearbox input shaft or output shaft configuration. The gearbox 40 is a reduction gearbox that is configured to accept a first input rotational drive (via the first input shaft 52) at a first input rotational drive speed and torque and a second input rotational drive (via the second input shaft 54) at a second input rotational drive speed and torque and produce an output rotational drive (via the output shaft 56) at an output rotational drive speed and at an output torque. When the HEP system 20 is operated to drive the propulsion unit 36, the first and second input rotational drive speeds are greater than the output rotational drive speed and the output torque is greater than the first and second input torques.

In the embodiments shown in FIGS. 3-5, the HEP system 20 further includes a reduction gearbox (RGB) 40A engaged with eMotor 30 and the gearbox 40. The gearbox 40 engaged with both the thermal engine 24 and the eMotor 30 will be referred to herein as the "primary gearbox 40" and the gearbox 40A engaged with eMotor 30 and the primary gearbox 40 will be referred to as the "secondary gearbox 40A". The present disclosure HEP system 20 does not require a secondary gearbox 40A.

In the embodiment shown in FIG. 3, the primary gearbox 40 includes a clutch mechanism 58 in communication with an internal gear assembly that allows the primary gearbox 40 to be disposed in an output engaged configuration and an output disengaged configuration. FIG. 3 diagrammatically illustrates the clutch mechanism 58 disposed between the first and second input shafts 52, 54 and a portion of the internal gear assembly. The present disclosure is not limited to any particular primary gearbox 40 configuration; e.g., the primary gearbox 40 may have a clutch mechanism 58 disposed in any manner that allows the primary gearbox 40 to be operated as described herein. In the output engaged configuration, the clutch mechanism 58 is engaged and the gearbox input shafts drive the output shaft 56. In the output disengaged configuration, the clutch mechanism 58 is disengaged and the input shafts are disconnected from the output shaft 56. In the output disengaged configuration, the first input shaft 52 and the second input shaft 54 are in geared communication with one another. Hence, in the output disengaged configuration the rotation of the second input shaft 54 (powered by the thermal engine 24) causes rotation of the first input shaft 52 (in communication with the eMotor 30). The clutch mechanism 58 may be any type of mechanism that is controllable to allow the gearbox 40 to be switched between the output engaged configuration to the output disengaged configuration and vice versa. In some embodiments, the control of the clutch mechanism 58 between the input and output engaged configurations may be accomplished by actuators and stored instructions executed by the controller.

In the embodiment shown in FIG. 4, the HEP system 20 includes a first clutch mechanism 58A, a second clutch mechanism 58B, and an intermediary shaft 60 engaged with both the first and second clutch mechanisms 58A, 58B. The first clutch mechanism 58A is engaged with the secondary gearbox 40A, the first input shaft 52 of the primary gearbox 40, and the intermediary shaft 60. The second clutch mechanism 58B is engaged with the thermal engine 24, the second input shaft 54 of the primary gearbox 40, and the intermediary shaft 60. In a HEP system 20 "propulsion configuration", the first clutch mechanism 58A is configured such that the rotational drive of the secondary gearbox 40A (from the eMotor 30) is provided to the first input shaft 52 of the primary gearbox 40, and the second clutch mechanism 58B is configured such that the rotational drive of the thermal engine 24 is provided to the second input shaft 54 of the primary gearbox 40. Hence, in the HEP system 20 propulsion configuration one or both the eMotor 30 and the thermal engine 24 may be used to drive the primary gearbox 40 and consequently the propulsion unit 36. In the HEP system 20 propulsion configuration, the first and second clutch mechanisms 58A, 58B are not in drive engagement with one another; i.e., neither the first clutch mechanism 58A nor the second drive mechanism is driving the intermediary shaft 60.

In a HEP system 20 "regeneration configuration", the eMotor 30 is operating as a generator and therefore is not operated to drive the first input shaft 52 of the primary gearbox 40. In a HEP system 20 regeneration configuration, the second clutch mechanism 58B is configured such that the rotational drive of the thermal engine 24 is provided to the intermediary shaft 60, and the first clutch mechanism 58A is configured such that the rotational drive of the intermediary shaft 60 (e.g., from the thermal engine 24) is provided to eMotor 30 which is configured to operate as a generator. Hence, in the HEP system 20 regeneration configuration the thermal engine 24 drives the eMotor 30 and neither the eMotor 30 nor the thermal engine 24 drive the primary gearbox 40 and/or the propulsion unit 36. The control of the first and second clutch mechanisms 58A, 58B may be accomplished by actuators and stored instructions executed by the controller.

The HEP system 20 embodiment shown in FIG. 5 is similar to the HEP system 20 shown in FIG. 4 and described above. This HEP system 20 embodiment further includes one or more accessories 62 that are engaged with the intermediary shaft 60. In this embodiment, the eMotor 30 or the thermal engine 24 can be used to drive the accessories 62. For example, the first clutch mechanism 58A may be configured to cause the eMotor 30 to drive the accessories 62 while the second clutch mechanism 58B is configured to cause the thermal engine 24 to drive the primary gearbox 40 and the propulsion unit 36. Conversely, the second clutch mechanism 58B may be configured to cause the thermal engine 24 to drive the accessories 62 while the first clutch mechanism 58A is configured to cause the eMotor 30 to drive the primary gearbox 40 and the propulsion unit 36.

The present disclosure HEP systems 20 shown in FIGS. 3-5 are described herein as including a single eMotor 30 and a secondary gearbox 40A. Embodiments of the present disclosure may include two or more eMotors 30. For example, the present disclosure HEP system 20 may include a first eMotor 30 and a second eMotor 30 both engaged with a secondary gearbox 40A, which secondary gearbox 40A is engaged with other system components as described herein.

It is known that an electric power storage unit 34 of a conventional HEP system 20 may be recharged during flight or when stationary on ground by a ground power unit (not shown); e.g., a ground power unit that is independent of the HEP system 20 and/or the aircraft 22. Depending on the flight of the aircraft 22, it may or may not be possible to fully charge the electric power storage unit 34 during flight. Recharging when the aircraft 22 is stationary on ground requires a ground power source. A person of skill will recognize that it is very often the case that a ground power source is not available. This is particularly true for fixed wing aircraft 22 that access non-commercial airports and rotary craft that access landing areas that are not airports.

The present disclosure provides a desirable option for HEP system 20 ground recharging. Before recharging is initiated, the system controller 38 may determine the electric power storage unit 34 state of charge and whether the electric power storage unit 34 is in a state that will allow recharging. The information used to determine the appropriateness of recharging may be provided to the system controller 38 from a battery controller, the eMotor control system 32, or any other monitoring system. There may also be a manual mode for when the operator can manually elect to charge or not charge the electric power storage unit 34. If recharging is desirable, the present disclosure HEP system 20 may then determine whether it is appropriate for the HEP system 20 to enter into a recharging mode. For example, the system controller 38 may via stored instructions collect/analyze system input (e.g., air/ground signals, weight-on-wheel signals, airspeed signals, altitude signals, rotor speeds, and the like) to determine the aircraft 22 is on the ground and stationary and that the state of the electric power storage unit 34 is acceptable for recharging.

Referring to the present disclosure embodiment shown in FIG. 3, if the system controller 38 determines that the electric power storage unit 34 should be recharged (i.e., regenerated) and that the state of the HEP system 20/aircraft 22 is acceptable for recharging, the system controller 38 may execute stored instructions that cause the clutch mechanism 58 to place the primary gearbox 40 in the output disengaged configuration wherein the drive output from the thermal engine 24 or the eMotor 30 cannot be transferred to the propulsion unit 36. In the output disengaged configuration, the system controller 38 (or other control system such as the eMotor control system 32) controls the eMotor 30 to operate as a generator that produces electrical energy. In this regeneration mode, the thermal engine 24 is operated to drive the eMotor 30 (now acting as a generator) to produce electrical energy and that electrical energy may be provided to the electric power storage unit 34 for recharging/regeneration.

In the present disclosure embodiments shown in FIGS. 4 and 5, if the system controller 38 determines that the electric power storage unit 34 should be recharged (i.e., regenerated) and that the state of the HEP system 20/aircraft 22 is acceptable for recharging, the system controller 38 may execute stored instructions that cause the HEP system 20 to be in the regeneration configuration. More specifically, the stored instructions cause the second clutch mechanism 58B to transfer the rotational drive of the thermal engine 24 to the intermediary shaft 60, and cause the first clutch mechanism 58A to transfer the rotational drive of the intermediary shaft 60 to the eMotor 30 (via the secondary gearbox 40A when included). In this regeneration mode, the thermal engine 24 is operated to drive the eMotor 30 (now acting as a generator) to produce electrical energy and that electrical energy may be provided to the electric power storage unit 34 for recharging.

In some embodiments, during regeneration of the electric power storage unit 34 the system controller 38 may monitor the state of charge of the electric power storage unit 34. In these embodiments, the present disclosure HEP system 20 may be configured to terminate the recharging of the electric power storage unit 34 if the electric power storage unit 34 no longer requires regeneration. Similarly, in some embodiments during regeneration of the electric power storage unit 34 the system controller 38 may monitor the status of the electric power storage unit 34 and/or other system components to verify the acceptability of regeneration. If the system controller 38 determines it is not acceptable to perform regeneration (e.g., because of component failure or the like), the present disclosure HEP system 20 may be configured to terminate the regeneration process.

Electric motors ("drive eMotor") that are sized to produce drive power for a HEP system 20 are typically larger than dedicated generators that may be included in a HEP system 20. The present disclosure use of a drive eMotor 30 as a generator is understood to provide a generator capable of recharging the electric power storage unit 34 in a shorter period of time than would be possible using a dedicated generator, and does not add the additional weight of a dedicated generator.

In the present disclosure embodiment shown in FIG. 5, the system controller 38 may be configured selectively provide rotational drive to the accessories 62. If it is desirable to power an accessory 62 (e.g., the determination of which may be made by the system controller 38, or may result from an operator input command), the system controller 38 may execute stored instructions that cause the first clutch mechanism 58A to engage with intermediary shaft 60 and the second clutch mechanism 58B to be disengaged with the intermediary shaft 60. In this configuration, the eMotor 30 may be controlled to provide rotational drive to the first clutch mechanism 58A and the first clutch mechanism 58A in turn causes the intermediary shaft 60 to rotationally drive the accessory. Alternately, the system controller 38 may execute stored instructions that may cause the second clutch mechanism 58B to engage with intermediary shaft 60 and the first clutch mechanism 58A to be disengaged with the intermediary shaft 60. In this configuration, the thermal engine 24 may be controlled to provide rotational drive to the second clutch mechanism 58B and the second clutch mechanism 58B in turn causes the intermediary shaft 60 to rotationally drive the accessory 62. In a operational scenario wherein the operation of the first and second clutch mechanisms 58A, 58B are operated to transfer the rotational drive of the thermal engine 24 to the intermediary shaft 60, and drive the eMotor 30 (e.g., as described above in FIG. 4), the accessories 62 may be driven at the same time during the regeneration.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A method of regenerating an electric power storage unit for an aircraft hybrid electric propulsion (HEP) system, wherein the HEP system includes a thermal engine, an electric motor, the electric power storage unit, a primary gearbox, and a propulsion unit, wherein the electric motor is configured within the HEP system to selectively provide rotational drive to the propulsion unit, the method comprising:
   controlling the electric motor to operate as a generator and produce electrical energy;
   controlling the primary gearbox of the HEP system to be in an output disengaged configuration, wherein in the output disengaged configuration a clutch mechanism of the primary gearbox configures the primary gearbox to disengage from driving the propulsion unit and to transfer rotational drive produced by the thermal engine to the electric motor;
   operating the thermal engine to rotationally drive the primary gearbox in the output disengaged configuration and thereby drive the electric motor; and
   regenerating the electric power storage unit by providing electrical energy produced by the electric motor to the electric power storage unit.

2. The method of claim 1, wherein the primary gearbox includes a first input shaft, a second input shaft, and an output shaft;
   wherein the first input shaft is in drive communication with the electric motor, and the second input shaft is in drive communication with the thermal engine, and the output shaft is in drive communication with the propulsion unit.

3. The method of claim 2, wherein the primary gearbox is controllable to be in the output disengaged configuration and in an output engaged configuration;
   wherein in the output disengaged configuration, the first input shaft and the second input shaft are disengaged from the output shaft, and in the output engaged configuration, the first input shaft and the second input shaft are engaged with the output shaft.

4. The method of claim 3, wherein the clutch mechanism is controllable to disengage the output shaft from the first input shaft and the second input shaft, and the clutch mechanism is controllable to engage the first input shaft and the second input shaft with the output shaft.

5. The method of claim 1, wherein the primary gearbox includes a first input shaft, a second input shaft, and an output shaft;
   wherein the method includes controlling the clutch mechanism to dispose the primary gearbox in an output engaged configuration to drive the propulsion unit; and controlling the clutch mechanism to dispose the primary gearbox in the output disengaged configuration during regeneration of the electric power storage unit.

6. The method of claim 1, wherein the method further includes determining a state of charge of the electric power storage unit state prior to performing the step of operating the thermal engine and the step of regenerating the electric power storage unit.

7. The method of claim 6, wherein the HEP system is an element of an aircraft, and the method further includes determining whether the aircraft is stationary and on a ground surface prior to performing the step of operating the thermal engine and the step of regenerating the electric power storage unit.

8. The method of claim 7, wherein the method further includes monitoring the state of charge of the electric power storage unit during the step of regenerating the electric power storage unit.

9. A method of regenerating an electric power storage unit for an aircraft hybrid electric propulsion (HEP) system, wherein the HEP system includes a thermal engine, an electric motor, the electric power storage unit, a primary gearbox, and a propulsion unit, wherein the electric motor is configured within the HEP system to selectively provide rotational drive to the propulsion unit, and the thermal engine is configured within the HEP system to selectively provide rotational drive to the propulsion unit, the method comprising:
operating a first clutch mechanism to disengage the electric motor from the primary gearbox and to engage with an intermediary shaft;
operating a second clutch mechanism to disengage the thermal engine from the primary gearbox and to engage with the intermediary shaft;
controlling the electric motor to operate as a generator and produce electrical energy;
operating the thermal engine to rotationally drive the electric motor using the intermediary shaft; and
regenerating the electric power storage unit by providing electrical energy produced by the electric motor to the electric power storage unit.

10. The method of claim 9, wherein primary gearbox includes a first input shaft, a second input shaft, and an output shaft;
wherein the first input shaft is in drive communication with the electric motor, and the second input shaft is in drive communication with the thermal engine, and the output shaft is in drive communication with the propulsion unit.

11. The method of claim 10, wherein the method further comprises driving an accessory using the intermediary shaft.

12. The method of claim 11, wherein the method further includes determining a state of charge of the electric power storage unit state prior to performing the step of operating the thermal engine and the step of regenerating the electric power storage unit.

13. The method of claim 12, wherein the HEP system is an element of an aircraft, and the method further includes determining whether the aircraft is stationary and on a ground surface prior to performing the step of operating the thermal engine and the step of regenerating the electric power storage unit.

14. The method of claim 13, wherein the method further includes monitoring the state of charge of the electric power storage unit during the step of regenerating the electric power storage unit.

15. An aircraft hybrid electric propulsion (HEP) system for an aircraft, comprising:
a propulsion unit;
a primary gearbox in selective drive communication with the propulsion unit, the primary gearbox comprising a clutch mechanism;
a thermal engine in drive communication with the primary gearbox and configured to provide rotational drive to the propulsion unit;
an electric motor in drive communication with the primary gearbox and configured to provide rotational drive to the propulsion unit;
an electric power storage unit; and
a system controller in communication with the primary gearbox and the electric motor, and a non-transitory memory storing instructions, which instructions when executed cause the system controller to:
control the electric motor to operate as a generator and produce electrical energy;
control the primary gearbox to be in an output disengaged configuration, wherein in the output disengaged configuration the clutch mechanism configures the primary gearbox to disengage from driving the propulsion unit and to transfer rotational drive produced by the thermal engine to the electric motor;
operate the thermal engine to rotationally drive the primary gearbox in the output disengaged configuration and thereby drive the electric motor; and
regenerate the electric power storage unit by providing electrical energy produced by the electric motor to the electric power storage unit.

16. The system of claim 15, wherein primary gearbox includes a first input shaft, a second input shaft, and an output shaft;
wherein the first input shaft is in drive communication with the electric motor, and the second input shaft is in drive communication with the thermal engine, and the output shaft is in drive communication with the propulsion unit; and
wherein in the output disengaged configuration, the clutch mechanism is disposed to disengage the first input shaft and the second input shaft from the output shaft.

17. The system of claim 16, wherein the instructions when executed cause the system controller to determine a state of charge of the electric power storage unit state prior to regeneration of the electric power storage unit.

18. The system of claim 17, wherein the instructions when executed cause the system controller to determine whether the aircraft is stationary and on a ground surface prior to the regeneration of the electric power storage unit.

19. The system of claim 18, wherein the instructions when executed cause the system controller to monitor the state of charge of the electric power storage unit during the regeneration of the electric power storage unit.

* * * * *